(12) United States Patent
Hwang (10) Patent No.: US 11,991,140 B2
(45) Date of Patent: May 21, 2024

(54) APPARATUS, METHOD, AND RECORDING MEDIUM FOR TRANSMITTING ELECTION CAMPAIGN MESSAGES IN MANNER OF DISPLAYING PHONE NUMBER OF ACQUAINTANCE OF RECIPIENT

(71) Applicant: Dongha Hwang, Seoul (KR)

(72) Inventor: Dongha Hwang, Seoul (KR)

( * ) Notice: Subject to any disclaimer, the term of this patent is extended or adjusted under 35 U.S.C. 154(b) by 0 days.

(21) Appl. No.: 18/458,760

(22) Filed: Aug. 30, 2023

(65) Prior Publication Data

US 2023/0412555 A1   Dec. 21, 2023

Related U.S. Application Data

(63) Continuation of application No. PCT/KR2022/000136, filed on Jan. 5, 2022.

(30) Foreign Application Priority Data

Mar. 2, 2021   (KR) .................. 10-2021-0027257

(51) Int. Cl.
*H04L 51/48* (2022.01)
*H04L 51/52* (2022.01)

(52) U.S. Cl.
CPC ............. *H04L 51/48* (2022.05); *H04L 51/52* (2022.05)

(58) Field of Classification Search
CPC ............................... H04L 51/48; H04L 51/52
USPC ....................................................... 709/206
See application file for complete search history.

(56) References Cited

U.S. PATENT DOCUMENTS

| | | | | |
|---|---|---|---|---|
| 10,489,817 B2 * | 11/2019 | Perkins | ................. | G06Q 50/01 |
| 10,664,852 B2 * | 5/2020 | DeLuca | ............. | G06Q 30/0201 |
| 10,666,760 B2 * | 5/2020 | Vasthimal | ............. | H04L 51/214 |
| 10,748,172 B2 * | 8/2020 | Chung | ................. | H04L 67/306 |
| 10,757,063 B2 * | 8/2020 | Marilly | ................. | G06Q 10/10 |
| 10,785,178 B2 * | 9/2020 | Lutsenko | ................ | H04L 67/53 |
| 10,869,170 B2 * | 12/2020 | Kassemi | ................ | H04W 4/14 |
| 10,942,913 B1 * | 3/2021 | Khoyilar | ................ | G06F 9/542 |
| 10,944,726 B2 * | 3/2021 | Bender | ................ | H04L 51/214 |

(Continued)

FOREIGN PATENT DOCUMENTS

| | | | |
|---|---|---|---|
| KR | 10-2003-0056259 A | | 7/2003 |
| KR | 200357095 Y1 * | | 7/2004 |

(Continued)

OTHER PUBLICATIONS

Office Action issued in KR 10-2021-0027257; mailed by the Korean Intellectual Property Office on Nov. 18, 2022.

(Continued)

*Primary Examiner* — Melvin H Pollack
(74) *Attorney, Agent, or Firm* — Studebaker & Brackett PC (57) ABSTRACT

The present disclosure relates to an apparatus for transmitting election campaign messages to display the number of an acquaintance of a recipient. When a request to transmit an election campaign message is received from an election candidate, an election campaign message is transmitted to the terminal of the voter linked to the election candidate. When the election campaign message is sent, the sender number of the message sent to each voter is set as the mobile phone number of the election campaigner linked to the corresponding voter as an acquaintance. Therefore, the recipient does not feel resistance in receiving the election campaign message.

10 Claims, 6 Drawing Sheets

(56) References Cited

U.S. PATENT DOCUMENTS

| | | | |
|---|---|---|---|
| 10,997,662 B1* | 5/2021 | Warfel | G06Q 30/0269 |
| 11,048,712 B2* | 6/2021 | Chadha | G06F 16/2365 |
| 11,055,736 B2* | 7/2021 | Doumar | G06Q 30/0267 |
| 11,057,339 B1* | 7/2021 | Stoddart | H04L 51/222 |
| 11,057,356 B2* | 7/2021 | Malhotra | G06F 16/288 |
| 11,106,794 B2* | 8/2021 | Chow | H04L 67/02 |
| 11,157,954 B1* | 10/2021 | Belanger | G06Q 30/0201 |
| 11,222,062 B2* | 1/2022 | Downey | G06F 16/48 |
| 11,222,346 B2* | 1/2022 | Noyes | G06Q 40/04 |
| 11,232,475 B2* | 1/2022 | Tekiela | G06Q 30/02 |
| 11,233,804 B2* | 1/2022 | Arzani | H04L 63/1425 |
| 11,238,390 B2* | 2/2022 | Brannon | G06F 21/6245 |
| 11,263,666 B2* | 3/2022 | Peter | G06F 16/9558 |
| 11,270,354 B2* | 3/2022 | Doumar | G06Q 30/0269 |
| 11,270,355 B2* | 3/2022 | Clark | G06Q 30/0277 |
| 11,285,372 B2* | 3/2022 | Wanke | G09B 19/0038 |
| 11,297,026 B2* | 4/2022 | Reuss | H04L 67/02 |
| 11,323,464 B2* | 5/2022 | Jakobsson | H04L 63/1425 |
| 11,323,505 B2* | 5/2022 | Leach | G06Q 30/0641 |
| 11,403,666 B2* | 8/2022 | Doumar | G06Q 30/0277 |
| 11,409,825 B2* | 8/2022 | Kelly | G06F 16/906 |
| 11,449,956 B2* | 9/2022 | Katzman | G06Q 10/105 |
| 11,507,609 B1* | 11/2022 | Warmsley | G06F 16/335 |
| 11,532,020 B2* | 12/2022 | Doumar | G06Q 30/0267 |
| 11,620,660 B2* | 4/2023 | Strutton | H04L 51/066 709/205 |
| 11,645,321 B2* | 5/2023 | Roller | G06F 40/35 707/737 |
| 11,687,957 B2* | 6/2023 | Chung | G06Q 30/0203 705/12 |
| 11,748,823 B2* | 9/2023 | Cameron | G09B 5/02 434/362 |
| 11,756,063 B2* | 9/2023 | King | G06Q 30/0201 705/7.33 |
| 11,836,741 B2* | 12/2023 | Gurbuxani | G06N 3/044 |
| 11,843,570 B2* | 12/2023 | Goldberg | H04L 51/48 |
| 2003/0042298 A1* | 3/2003 | Allen, Jr. | G06Q 20/357 235/375 |
| 2007/0016468 A1* | 1/2007 | Campbell | G06Q 10/10 705/12 |
| 2007/0272749 A1* | 11/2007 | Gehrke | G07C 13/00 235/386 |
| 2009/0313094 A1* | 12/2009 | Singh | G06Q 40/12 705/30 |
| 2014/0229841 A1* | 8/2014 | Muller | G06F 3/0481 715/738 |
| 2017/0017976 A1* | 1/2017 | Gillis | G06Q 30/0204 |
| 2020/0004813 A1* | 1/2020 | Galitsky | G06F 40/30 |
| 2020/0342137 A1* | 10/2020 | Barday | G06F 16/128 |
| 2020/0387924 A1* | 12/2020 | Patel | G06N 5/043 |
| 2020/0410530 A1* | 12/2020 | Kugler | H04L 67/02 |
| 2021/0065313 A1* | 3/2021 | South | G06F 3/0482 |
| 2021/0174625 A1* | 6/2021 | Pinkerton | G06F 16/27 |
| 2022/0020055 A1* | 1/2022 | Tate | G06Q 30/0248 |
| 2022/0051273 A1* | 2/2022 | Li | H04W 4/21 |
| 2022/0058583 A1* | 2/2022 | Thompson | G06Q 10/1095 |
| 2022/0132276 A1* | 4/2022 | Choi | H04L 67/535 |
| 2022/0148014 A1* | 5/2022 | Lee | G06Q 30/0201 |

FOREIGN PATENT DOCUMENTS

| | | | |
|---|---|---|---|
| KR | 10-0706486 B1 | | 4/2007 |
| KR | 20080007949 A | * | 1/2008 |
| KR | 10-2010-0073308 A | | 7/2010 |
| KR | 20120005075 A | * | 1/2012 |
| KR | 10-2015-0078957 A | | 7/2015 |
| KR | 20170092191 A | * | 8/2017 |
| KR | 10-1813693 B1 | | 12/2017 |
| KR | 10-1947784 B1 | | 2/2019 |
| KR | 20190031137 A | * | 3/2019 |
| KR | 10-2019-0076870 A | | 7/2019 |
| KR | 10-2020-0094561 A | | 8/2020 |
| WO | WO-2023007640 A1 | * | 2/2023 |

OTHER PUBLICATIONS

International Search Report issued in PCT/KR2022/000136; mailed Jun. 9, 2022.

* cited by examiner

FIG. 6

APPARATUS, METHOD, AND RECORDING MEDIUM FOR TRANSMITTING ELECTION CAMPAIGN MESSAGES IN MANNER OF DISPLAYING PHONE NUMBER OF ACQUAINTANCE OF RECIPIENT

CROSS-REFERENCE TO RELATED APPLICATION

The present application is a continuation of International Patent Application No. PCT/KR2022/000136, filed on Jan. 5, 2022, which is based upon and claims the benefit of priority to Korean Patent Application No. 10-2021-0027257 filed on Mar. 2, 2021. The disclosures of the above-listed applications are hereby incorporated by reference herein in their entirety.

BACKGROUND

1. Technical Field

The present disclosure relates to a system for transmitting election campaign messages.

2. Description of Related Art

Recently, there has been an increase in election campaigns using message transmission.

However, in a case of a current message transmission system, if recipients receive messages from unknown numbers, the recipients may not read or may block such messages. Accordingly, an election campaign using message transmission is not significantly effective.

For this reason, it is necessary to find a method of transmitting messages for election campaigns so as not to make recipients feel resistance. However, there currently exists no publicly disclosed technology related to the above.

SUMMARY

The present disclosure has been made to solve the above-mentioned problems occurring in the prior art, and in an aspect of the present disclosure, the present disclosure aims to, when receiving a mobile phone number of an acquaintance of an election campaigner from the election campaigner, store the received phone number in a database as a voter number by linking the received number to the acquaintance of the corresponding election campaigner.

Furthermore, the present disclosure aims to, when receiving an election campaign message transmission request from an election candidate, send an election campaign message to a terminal of a voter linked to the election candidate. In this instance, a caller number of the message transmitted to each voter is set as a phone number of an election campaigner linked to each voter as an acquaintance.

The aspects of the present disclosure are not limited to those mentioned above, and other aspects not mentioned herein will be clearly understood by those skilled in the art from the following description.

To accomplish the above-mentioned objects, according to an aspect of the present disclosure, there is provided an apparatus for transmitting election campaign messages in a manner of displaying a phone number of an acquaintance of a recipient, including: a database storing a name and a mobile phone number of at least one election campaigner who acts for an election candidate using an election campaign message transmission service, and a mobile phone number of at least one voter linked to each election campaigner as an acquaintance; a communication unit communicating with a terminal of the election candidate, a terminal of the election campaigner, and a terminal of the voter; and a processor which, upon receiving an election campaign message transmission request from a specific election candidate's terminal, sends an election campaign message to the terminal of the voter linked to the specific election candidate, sets a phone number of a sender, who sends the message to each voter, as a mobile phone number of the election campaigner linked to each voter as an acquaintance, and then sends the message, wherein when receiving at least one acquaintance's mobile phone number from the election campaigner's terminal, the processor sends a request message for election campaign message reception consent to the received mobile phone number, and stores the mobile phone number, which agreed to receive the election campaign message, as a voter.

Moreover, when receiving a subscription request of the election campaign message transmission service from the specific election candidate, the processor stores election campaign message transmission service subscription information of the specific election candidate in a database. When receiving a subscription request of the election campaign message transmission service for a specific election campaigner from the terminal of the specific election candidate, the processor sends a service subscription request to the mobile phone number of the specific election campaigner, and when receiving a service subscription consent, stores the service subscription information of the specific election campaigner in the database. When receiving a service subscription request for the mobile phone number of at least one acquaintance from the terminal of the specific election campaigner, the processor sends a service subscription request to the mobile phone number of the at least one acquaintance, links the mobile phone number, which received the service subscription consent, as an acquaintance of the specific election campaigner, stores the mobile phone number as a voter, and stores service subscription information in the database. The processor provides the election candidate with the authority to request a service subscription for the election campaigner, and sets the election campaigner who has been granted the service subscription authority from the election candidate as a senior election campaigner. The processor provides the senior election campaigner with the authority to request service subscription for other election campaigners.

Furthermore, when receiving a service cancellation request from a specific voter's terminal, the processor stores service cancellation information in the database, and provides the service cancellation details to at least one of the terminal of the election campaigner linked as an acquaintance of the specific voter, the terminal of the election candidate of the corresponding election campaigner, and the terminal of the specific voter. When receiving a service cancellation request from a specific election campaigner's terminal, the processor stores service cancellation information in the database, and provides the service cancellation details to at least one of the terminal of the specific election campaigner and the terminal of the election candidate of the specific election campaigner. When receiving a service cancellation request from a specific election candidate's terminal, the processor stores service cancellation information in the database, and provides the service cancellation details to the terminal of the specific election candidate.

Additionally, the processor stores at least one, among the name and the phone number of the voter, the name and the phone number of the election campaigner who recommended the service subscription to the voter, the service subscription date, and the service cancellation date, in a voter table of the database. The processor stores at least one, among the name and the phone number of the election campaigner, information of a person who recommended the service subscription to the election campaigner, the service subscription date of the election campaigner, and the service cancellation date of the election campaigner, in an election campaigner table of the database.

In addition, when receiving at least one acquaintance's mobile phone number from the election campaigner's terminal, in a case of receiving the relationship information between the election campaigner and the acquaintance, the processor stores relationship information between the election campaigner and the acquaintance in the database. When receiving an election campaign message transmission request from a specific election candidate's terminal, the processor creates greetings based on the relationship information of each voter and the election campaigner linked to each voter. The processor sends the created greetings by attaching the greetings to the election campaign message.

Moreover, the processor calculates an election campaign index for the corresponding election candidate based on the number of election campaigners for the election candidate, the number of voters linked to each election campaigner, and the number of voters who have consented to receive election campaign messages. The processor calculates an election campaign effectiveness score of the election campaign message transmission service based on public opinion poll data for the election candidate in public opinion poll data collected from the outside, and the calculated election campaign index. When receiving a specific target value of the election campaign effectiveness score from the election candidate's terminal, the processor calculates at least one of the number of required election campaigners, the number of voters linked per required election campaigners, and the total number of required voters to achieve the specific target value, and provide the calculated results to the election candidate's terminal.

Furthermore, the processor calculates an election campaign index for the corresponding election candidate based on the number of election campaigners for the election candidate, the number of voters linked to each election campaigner, and the number of voters who have consented to receive election campaign messages. The processor calculates an actual expected value of the calculated election campaign index based on age-specific voting rate data during a recent specific period and the number of age-specific voters linked to the election candidate.

Furthermore, the processor receives at least one of the age, gender, and interests of the voter linked as an acquaintance from the election campaigner's terminal. When receiving an election campaign message transmission request from the terminal of a specific election candidate, the processor includes the contents of a pledge, which match at least one of each voter's age, gender, and interests, out of the pledges of the election candidate, and transmits the election campaign message to each voter.

In another aspect of the present invention, there is provided a method for transmitting election campaign messages in a manner of displaying a phone number of an acquaintance of a recipient, which is executed by a computer, including the operations of: receiving at least one acquaintance's mobile phone number from an election campaigner's terminal; sending a request message for election campaign message reception consent to the received mobile phone number, linking the mobile phone number, which agreed to receive the election campaign message, as an acquaintance of the campaigner, and storing the mobile phone number as a voter; receiving an election campaign message transmission request from a terminal of a specific election candidate; and sending an election campaign message to a voter's terminal linked to the specific election candidate, setting a sender number of the message transmitted to each voter as a mobile phone number of the election campaigner linked to each voter as an acquaintance to send the message, wherein the computer includes: a database storing a name and a mobile phone number of at least one election campaigner who acts for an election candidate using an election campaign message transmission service, and a mobile phone number of at least one voter linked to each election campaigner as an acquaintance; and a communication unit communicating with a terminal of the election candidate, a terminal of the election campaigner, and a terminal of the voter.

Besides the above, other methods and other systems for realizing the present disclosure, and a computer-readable recording medium, which records a computer program for executing the method can also be provided.

DETAILED DESCRIPTION

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, preferred embodiments of the present disclosure will be described in detail with reference to the accompanying drawings.

The meanings of terms used in this specification will be clarified in brief. However, the description of terms is intended to aid the understanding of this specification, and unless specifically stated as limiting the invention, it should not be construed as limiting the technical spirit of the invention.

Figure 1:
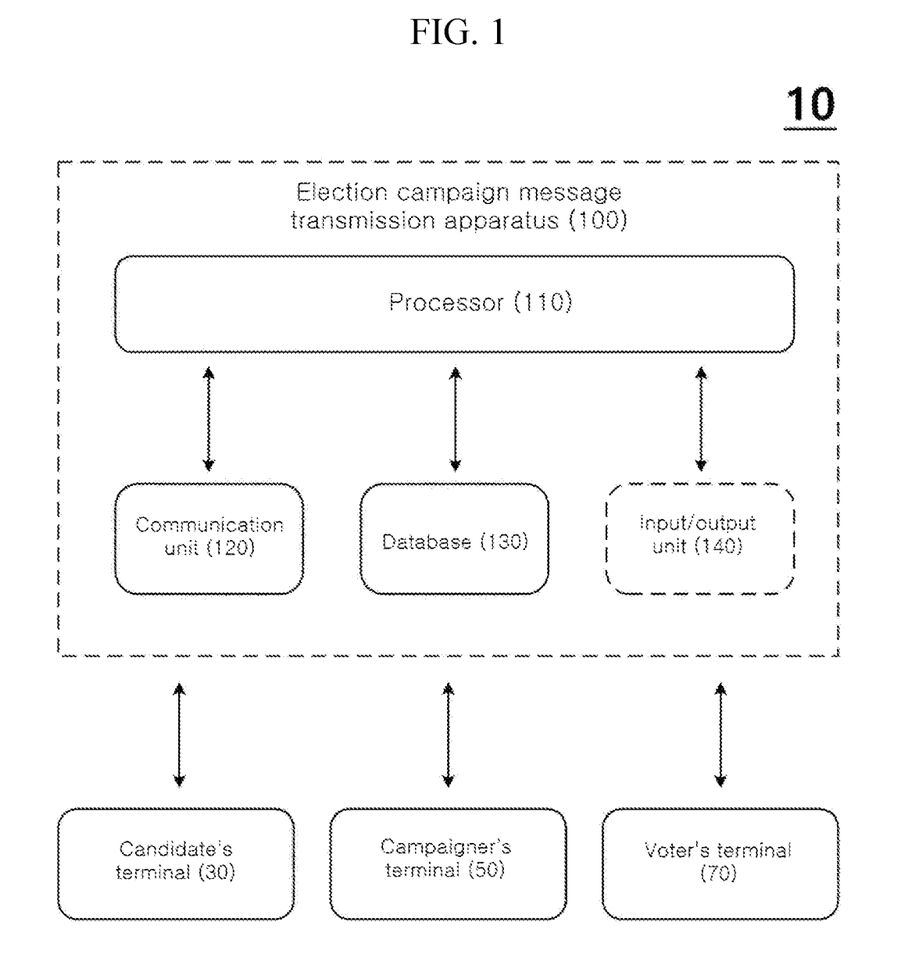
FIG. 1 is a block diagram of an election campaign message transmission system according to an embodiment of the present disclosure.

FIG. 1 is a block diagram of an election campaign message transmission system according to an embodiment of the present disclosure.

Figure 2:
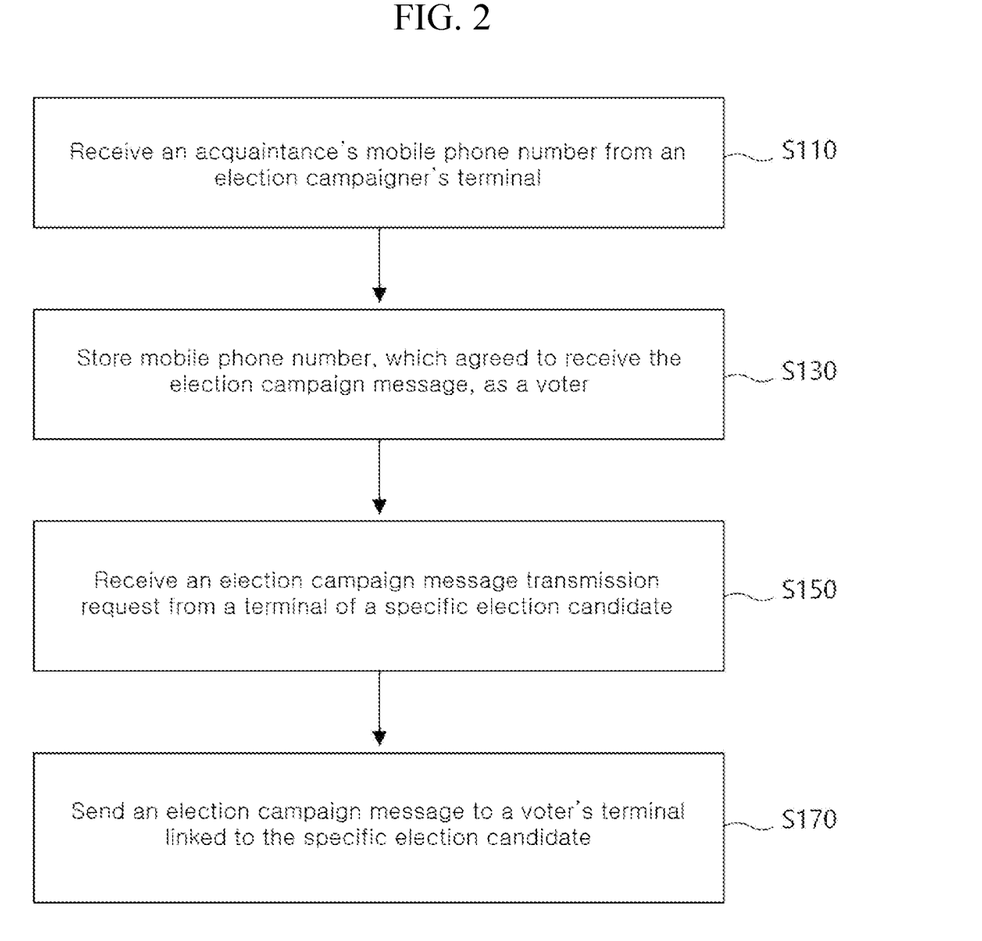
FIG. 2 is a flowchart of an election campaign message transmission method according to an embodiment of the present disclosure.

FIG. 2 is a flowchart of an election campaign message transmission method according to an embodiment of the present disclosure.

Figure 3:
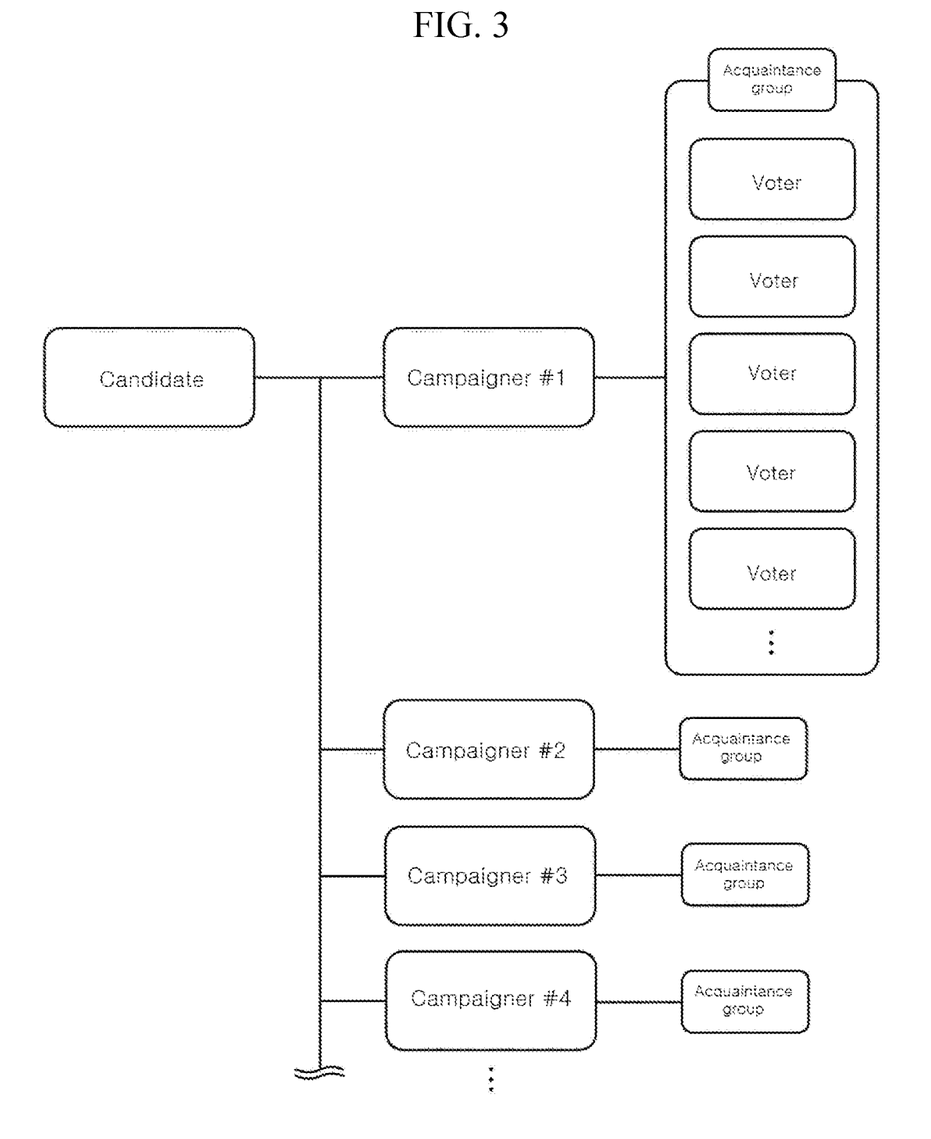
FIG. 3 is a view illustrating that a list of election campaigners linked to an election candidate, and a list of voters linked to each election campaigner as acquaintances, are stored in a database.

FIG. 3 is a view illustrating that a list of election campaigners linked to an election candidate, and a list of voters linked to each election campaigner as acquaintances, are stored in a database.

Figure 4:
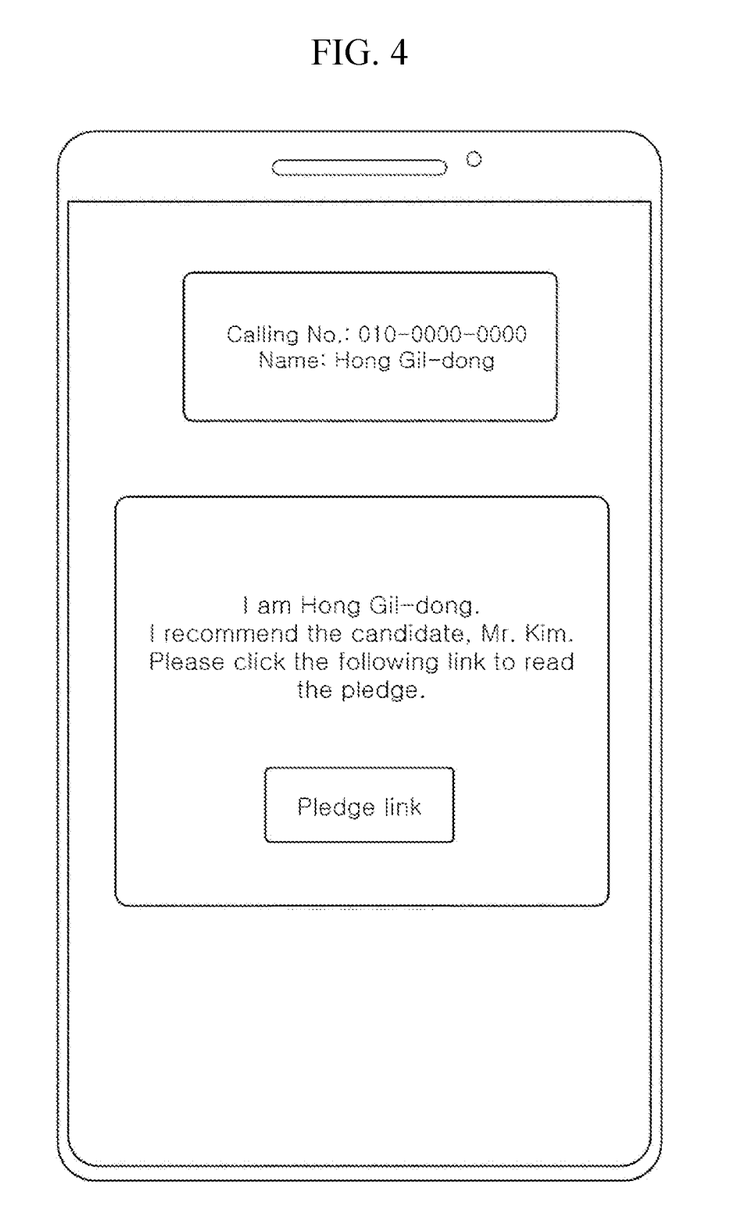
FIG. 4 is a view illustrating a state in which an election campaign message transmission apparatus according to an embodiment of the present disclosure sends an election campaign message to a voter linked to an election campaigner as an acquaintance, Hong Gil-dong.

FIG. 4 is a view illustrating a state in which an election campaign message transmission apparatus according to an embodiment of the present disclosure sends an election campaign message to a voter linked as an acquaintance to an election campaigner, Hong Gil-dong.

Figure 5:
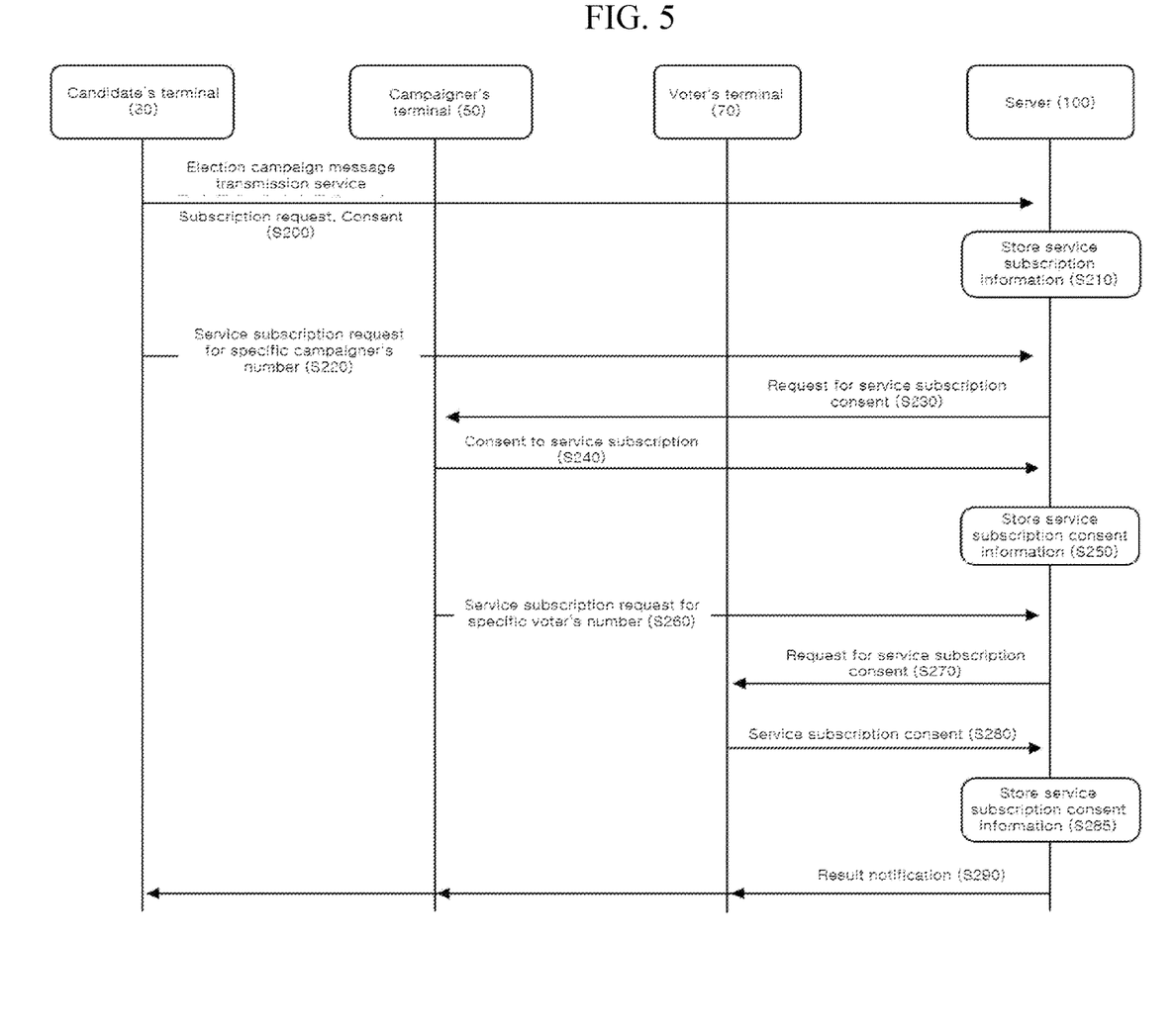
FIG. 5 is a view illustrating the subscription to the election campaign message service.

FIG. 5 is a view illustrating the subscription to the election campaign message service.

Figure 6:
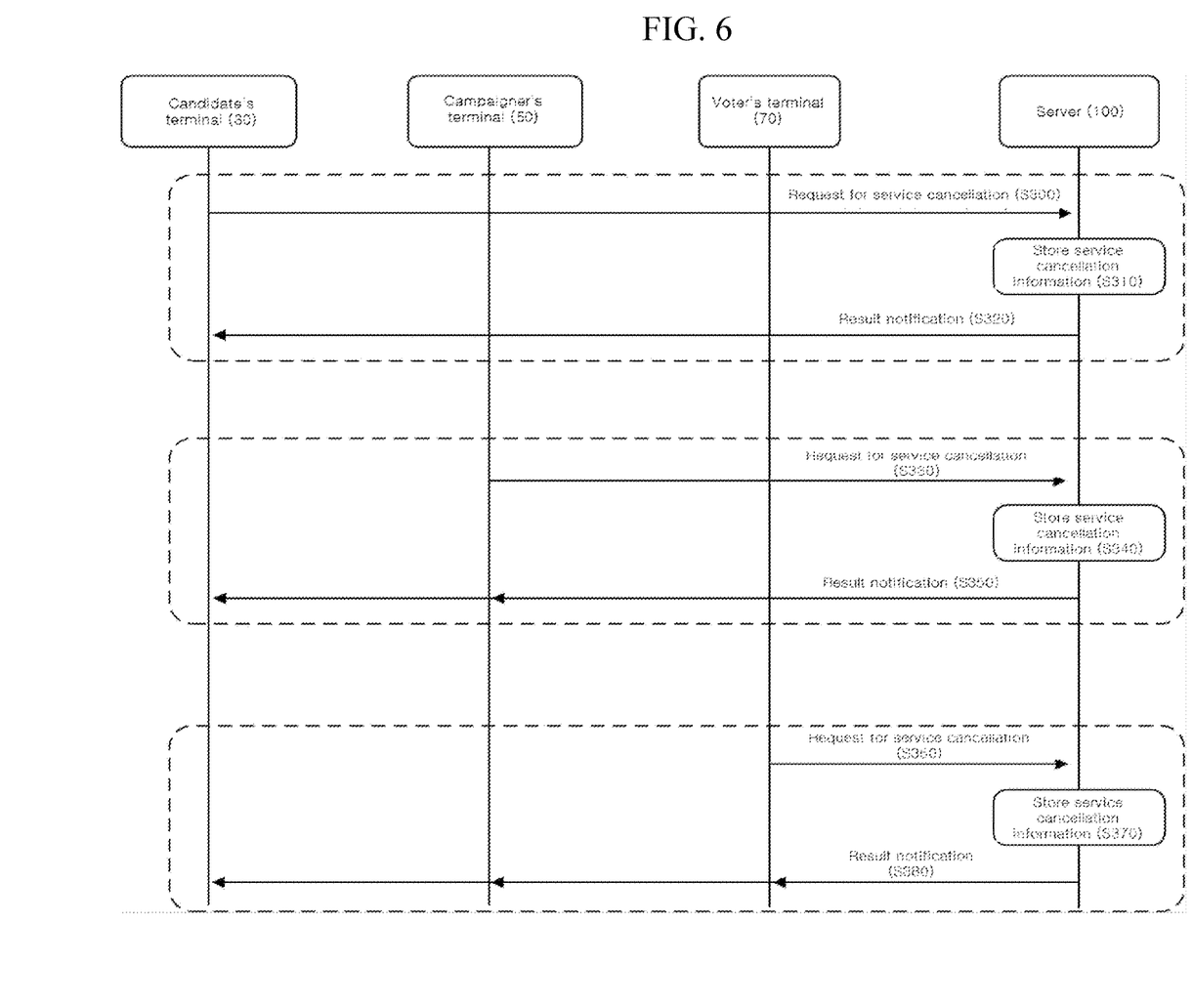
FIG. 6 is a diagram illustrating the cancellation of the election campaign message service.

FIG. 6 is a diagram illustrating the cancellation of the election campaign message service.

Hereinafter, referring to FIGS. 1 to 6, a system 10, an apparatus 100, and a method for transmitting election campaign messages according to the embodiment of the present disclosure will be described.

The election campaign message transmission apparatus 100 according to an embodiment of the invention can be implemented by a computer or an information processing means.

It is desirable for the election campaign message transmission apparatus to be implemented in the form of a server as receiving election campaign messages through wired/wireless communication networks and sending election campaign messages to voter terminals 70. Accordingly, the election campaign message transmission apparatus can typically be implemented as an election campaign message transmission server.

In an embodiment, the server can provide a separate service application to provide election campaign message services, and election candidates and campaigners can install a service application on their terminals and log in to use the service.

Referring to FIG. 1, the election campaign message transmission system 10 according to an embodiment of the present disclosure includes an election campaign message transmission apparatus 100, an election candidate terminal 30, an election campaigner terminal 50, and a voter terminal 70.

Furthermore, the election campaign message transmission apparatus 100 includes a processor 110, a communication unit 120, and a database 130. In some embodiments, the election campaign message transmission apparatus 100 may further include an input/output unit 140.

However, in some embodiments, the election campaign message transmission apparatus 100 may include fewer or more components than those illustrated in FIG. 1.

A brief description of each component will be provided.

The database 130 stores a name and a mobile phone number of at least one election campaigner who acts for an election candidate using the election campaign message transmission service, and a name and a mobile phone number of at least one voter linked to each election campaigner as an acquaintance.

Additionally, the database 130 further stores the service contract (subscription)/cancellation information of the election candidate, service subscription/cancellation consent information of the election campaigner, and service subscription/cancellation consent information of the voter. Details regarding the service contract, subscription, and cancellation will be described later.

The communication unit 120 communicates with the election candidate's terminal 30, the election campaigner's terminal 50, and the voter's terminal 70 via a mobile communication network.

The processor 110, upon receiving an election campaign message transmission request from the terminal 30 of a specific election candidate, sends an election campaign message to the terminal 70 of the voter linked to the corresponding election candidate.

Referring to the flowchart of FIG. 2, the system 10, the apparatus 100, and the method for transmitting election campaign messages according to the embodiment of the present disclosure will be described in more detail.

The election campaign message transmission apparatus 100 receives, through the communication unit 120, at least one acquaintance's mobile phone number from the election campaigner's terminal 50 (S110).

Next, the processor 110 sends a request message for election campaign message reception consent (request message for service subscription consent) to the mobile phone number received in operation S110, and then, links the mobile phone number, which has agreed to receive the election campaign message, as an acquaintance to the corresponding campaigner and stores the mobile phone number as a voter in the database 130 (S120).

In the embodiment of the present disclosure, the election candidate may be an election candidate running not only in public elections but also in various associations or organizations.

In this instance, the corresponding election campaigner is an election campaigner working for an election candidate who has subscribed/contracted to the service. It is assumed that the election campaigner is also a service subscriber.

The election campaigner can invite his or her acquaintances as voters for the election candidate. When the receiving the mobile phone number of the campaigner's acquaintance from the election campaigner's terminal 50, apparatus 100 sends a request message for election campaign message reception consent to the corresponding number.

In this case, the election campaign message transmission apparatus 100 can receive at least one acquaintance's mobile phone number from the election campaigner's terminal 50, and can receive a plurality of mobile phone numbers or even all phone numbers in a phone book.

Furthermore, when receiving the consent to election campaign message reception, the processor 110 links the mobile phone number as an acquaintance of the corresponding election campaigner and stores the phone number as a voter.

Referring to FIG. 3, being "linked" in the embodiment of the present disclosure can mean being connected or affiliated.

Therefore, it is implied that the election campaigner working for the election candidate is affiliated with the corresponding election candidate, and the voter linked to the election campaigner as an acquaintance is affiliated with the election candidate linked to the election campaigner.

Therefore, as illustrated in FIG. 3, the database 130 stores names and mobile phone numbers of one or more election campaigners acting for the election candidate registered with the election campaign message transmission service, and names and mobile phone numbers of one or more voters linked to each election campaigner as acquaintances.

The election campaign message transmission apparatus 100 receives an election campaign message transmission request from the terminal 30 of a specific election candidate via the communication unit 120 (S150).

The processor 110 of the election campaign message transmission apparatus 100 sends an election campaign message to the terminal 70 of the voter linked to the specific election candidate. When sending the message to each voter, the processor 110 sets a sender number of the message transmitted to each voter as a phone number of the election campaigner linked to each voter as an acquaintance and requests for transmission of a message (S170).

In detail, when receiving the contents of the election campaign message, pledges or a link of the pledges from the election candidate's terminal 30, the processor 110 of the election campaign message transmission apparatus 100 sends a message to the voter's terminal 70 linked to the election candidate.

Preferably, the processor 110 of the election campaign message transmission apparatus 100 requests the transmission of the message through the mobile communication network.

However, the election campaign messages are not limited to text messages, and can be provided via a messenger or an SNS service, having a message transmission function, such as Kakao Talk, Line, Facebook messenger, or the like.

At this time, the processor 110 queries the database 130 and sends messages to voters who have consented to receive election campaign messages, among voters linked to the election candidate.

Therefore, in the embodiment of the present disclosure, voters to whom the election campaign message is sent are voters who have agreed to receive election campaign messages, namely, registered for the election campaign message transmission service.

Additionally, as illustrated in FIG. 4, the processor 110 does not unilaterally send messages to voters as in the conventional method, but sends messages after setting the mobile phone number of the election campaigner linked as an acquaintance to the voter as a message sender number.

Accordingly, the voter who receives the messages receives messages as if the messages have been sent by an acquaintance.

As a result, the voter who received the election campaign message does not think the election campaign messages as spam messages and does not feel resistance.

In an embodiment, when receiving at least one acquaintance's mobile phone number from the election campaigner's terminal 50, the processor 110 may request for the input of relationship information between the election campaigner and the acquaintance.

When receiving the relationship information between the election campaigner and the acquaintance, the processor 110 stores the information in the database 130.

When receiving an election campaign message transmission request from a specific election candidate's terminal 30, the processor 110 creates greetings based on the relationship information of each voter and the election campaigner linked to each voter.

Then, the processor 110 can send the created greetings by attaching the greetings to the election campaign message.

Accordingly, in addition to sending the name and mobile phone number of the election campaigner linked to the voter as an acquaintance, the election campaign message transmission apparatus 100 can create and insert greetings in consideration of the relationship between the voter and the acquaintance. Therefore, the election campaign message transmission apparatus 100 can provide election campaign messages as if the voter receives a personal greeting message.

In an embodiment, the election campaign message transmission apparatus 100 can calculate an election campaign index.

In detail, the processor 110 calculates the election campaign index for the corresponding election candidate based on the number of election campaigners for the election candidate, the number of voters linked to each election campaigner, and the number of voters who have consented to receive election campaign messages.

The processor 110 can calculate an election campaign effectiveness score of the election campaign message transmission service based on public opinion poll data for the election candidate in public opinion poll data collected from the outside, and the calculated election campaign index.

When receiving a specific target value of the election campaign effectiveness score from the election candidate's terminal 30, the processor 110 can calculate at least one of the number of required election campaigners, the number of voters linked per required election campaigners, and the total number of required voters to achieve the specific target value, and provide the calculated results to the election candidate's terminal 30.

Therefore, the election candidate can understand the election campaign effectiveness score by using the election campaign message service, and can increase the number of election campaigners and voters based on the number of required election campaigners and the number of total voters to achieve the target value.

In an embodiment, the processor 110 can calculate the election campaign index based on the number of election campaigners for the election candidate, the number of voters linked to each election campaigner, and the number of voters who have agreed to receive election campaign messages.

Accordingly, the processor 110 can calculate the election campaign index for each election campaigner working for the election candidate.

Furthermore, the processor 110 can calculate an actual expected value of the calculated election campaign index based on age-specific voting rate data during a recent specific period and the number of age-specific voters linked to the election candidate.

FIG. 5 illustrates the subscription in the election campaign message service.

Referring to FIG. 5, a flow of joining the election campaign message service provided by the election campaign message transmission apparatus 100 according to an embodiment of the present disclosure will be described. (The service mentioned in the embodiment of the present disclosure refers to an election campaign message service.)

<Election Candidate's Subscription in Service>

When receiving a request for the election campaign message transmission service subscription and consent to the service subscription from a specific candidate's terminal 30, the processor 110 stores the election candidate's election campaign message transmission service subscription information in the database 130 (S200 and S210).

At this time, the service subscription information may include details such as the election candidate's name, mobile phone number, and contract terms related to the service subscription.

Specifically, when receiving a request for the election campaign message transmission service subscription from a specific election candidate, the processor 110 can provide the contract terms for joining to the election candidate's terminal 30, and request consent.

<Election Campaigner's Subscription in Service>

When receiving a service subscription request for a specific election campaigner from a specific election candidate's terminal 30, the processor 110 sends a request for consent to the service subscription to the corresponding election campaigner's terminal 50 (S220 and S230).

Furthermore, when receiving service subscription consent from the corresponding election campaigner's terminal 50, the processor 110 stores the service subscription consent information of the corresponding election campaigner in the database 130 (S240 and S250).

<Voter's Subscription in Service>

When receiving a service subscription request for at least one acquaintance's mobile phone number from a specific election campaigner's terminal 50, the processor 110 sends a service subscription request to the at least one acquaintance's mobile phone number (S260 and S270).

Furthermore, the processor 110 links the mobile phone number that received the service subscription consent to the specific election campaigner's acquaintance, stores the phone number as a voter, and stores the service subscription consent information for the corresponding voter in the database 130 (S280 and S285).

At this point, receiving the service registration consent can mean agreeing to receive election campaign messages.

<Senior Election Campaigner>

In an embodiment, the processor 110 provides the authority to request subscription to the election campaigner's election campaign message transmission service to the election candidate.

At this point, the processor 110 sets the election campaigner, who has been granted the service subscription request authority from the election candidate, as a senior election campaigner, and provides the senior election campaigner with the service subscription request authority for other election campaigners.

Such a configuration signifies granting authority to a specific election campaigner, among the election campaigners working for the election candidate, to request service subscription to the apparatus 100 so that the specific election campaigner can join the election campaign message transmission service.

At this time, if only the election candidate has the authority to request service subscription for the election campaigner, when an election campaigner is busy or when there are subscription requests for many election campaigners, subscription requests for many election campaigners may be restricted, so the authority to request service subscription is granted to the senior election campaigner.

FIG. 6 illustrates cancellation of the election campaign message service.

Referring to FIG. 6, a flow of cancellation of the service provided by the election campaign message transmission apparatus 100 according to an embodiment of the present disclosure will be described.

<Cancellation of Service by Election Candidate>

When receiving a service cancellation request from a specific election candidate's terminal 30, the processor 110 stores service cancellation information for the corresponding election candidate in the database 130 (S300 and S310).

Thereafter, the processor 110 provides the service cancellation details to the election candidate's terminal 30 (S320, cancellation result notification).

<Cancellation of Service by Election Campaigner>

When receiving a service cancellation request from a specific election campaigner's terminal 50, the processor 110 stores service cancellation information for the corresponding election campaigner in the database 130 (S330 and S340).

Thereafter, the processor 110 provides service cancellation details to at least one of the election campaigner's terminal 50 and the election candidate's terminal 30 of the corresponding election campaigner (S350, cancellation result notification).

<Cancellation of Service by Voter>

When receiving a service cancellation request from a specific voter's terminal 70, the processor 110 stores service cancellation information for the corresponding voter in the database 130 (S360 and S370).

Thereafter, the processor 110 provides the service cancellation details to at least one of the voter's terminal 70, the terminal 50 of the election campaigner linked to the corresponding voter as an acquaintance, and the terminal 30 of the election candidate linked to the corresponding voter (S380, cancellation result notification).

As described above, the processor 110 manages the service subscription and cancellation for the election candidates, election campaigners, and voters.

In an embodiment, the processor 110 stores at least one, among the name and the phone number of the voter, the name and the phone number of the election campaigner who recommended the service subscription to the voter, the service subscription date, and the service cancellation date, in a voter table of the database 130.

At this time, the election campaigner who recommended the service to the voter refers to the election campaigner who is linked to the voter as an acquaintance.

In an embodiment, the processor 110 stores at least one, among the name and the phone number of the election campaigner, information of a person who recommended the service subscription to the election campaigner, the service subscription date of the election campaigner, and the service cancellation date of the election campaigner, in an election campaigner table of the database 130.

At this time, the person who recommended the service subscription to the election campaigner refers to an election candidate of the election campaigner or a senior election campaigner.

At this time, in a case in which the specific election campaigner is a senior election campaigner, the processor 110 may additionally store at least one, among the date when the service subscription request authority was granted to the senior election campaigner, the date when the service subscription request authority was cancelled, and a list of election campaigners subscribed in the service by the senior election campaigner, in the database 130.

Therefore, the processor 110 of the apparatus 100 can store and manage all records related to the election campaign message transmission service in the database 130.

Although it is described that the database 130 is provided in the election campaign message transmission server in the embodiment described above, but the present invention is not limited thereto, and the database 130 may be provided in a telecommunication company server.

In some embodiments, the election campaign message transmission server may refer to a telecommunication company's server.

In such an embodiment, the telecommunication company's server manages the configuration of the database, and when receiving an election campaign message transmission request signal from the election candidate terminal 30, sends election campaign messages to the terminals of the voters affiliated with the election candidate in the same manner as the aforementioned process.

In an embodiment, the processor 110 receives at least one of the age, gender, and interests of the voter linked as an acquaintance from the election campaigner's terminal 50 and stores the at least one of the age, gender, and interests of the voter in the database.

In addition, when receiving an election campaign message transmission request from the terminal 30 of a specific election candidate, the processor 110 can include the contents of a pledge, which match at least one of each voter's age, gender, and interests, out of the pledges of the election candidate, and transmit the election campaign message to each voter.

For example, the processor 110 can send an election campaign message, which contain the contents of the pledge related to employment, to voters aged 20 to 29.

The processor 110 can send an election campaign message, which contain the contents of the pledge related to home ownership, to voters aged 30 to 40.

The processor 110 can send an election campaign message, which contain the contents of the pledge related to retirement support, to voters aged 50 to 60.

The processor 110 can send an election campaign message, which contain the contents of the pledge related to gender equality, to female voters.

The processor 110 can send an election campaign message, which contain the contents of the pledge related to support measures for self-employed people to voters who have 'self-employment' as an interest.

The election campaign message transmission apparatus 100 according to an embodiment of the present invention can include the contents of a pledge, in which each voter may be interested, in the message, thereby making the voter more interested in the pledge of the candidate.

The method according to an embodiment of the present disclosure can be implemented as a program (or application) to be executed by being combined with a server which is hardware, and can be stored in a medium.

The program may include code coded as a computer language, such as C, C++, Java, machine language, etc. which a processor (CPU) of the computer can read through a device interface of a computer. The code may include a functional code associated with a function that defines necessary functions for executing the methods, and may include an execution procedure-related control code in which the processor of the computer needs to execute the functions according to predetermined procedures. In addition, the code may further include additional information necessary for the processor of the computer to execute the functions or memory reference-related code for whether the media should be referenced in which location (address) of the internal or external memory of the computer. Moreover, if communication with any other computer or server in a remote location is required to execute the functions by the process of the computer, the code may further include communication-related code for how to communicate with any other computer or server at a remote location using the communication module of the computer, or whether or not any information or media should be transmitted and received in the communication.

The medium to be stored refers not to a medium storing data for a short time but to a medium that stores data semi-permanently, like a register, cache, memory, and the like, and means a medium readable by a device. In detail, as examples of the medium to be stored, there are read-only memories (ROMs), random access memories (RAMs), CD-ROMs, magnetic tapes, floppy disks, optical data storage devices, and the likes, but the present disclosure is not limited thereto. That is, the program can be stored in various recording media on a variety of servers that can be accessed by a computer or various recording media on the user's computer. Furthermore, the media can store code that is distributed to a computer system connected to the network and that is readable by the computer in a distributed fashion.

The method or algorithm described in relation to the embodiments of the present disclosure can be directly embodied in hardware, can be embodied in a software module executed by hardware, or can be embodied by combination thereof. The software module can reside in a random access memory (RAM), a read-only memory (ROM), an erasable programmable read-only memory (EPROM), an electrically erasable programmable read-only memory (EEPROM), a flash memory, a hard disk, a detachable disk, a CD-ROM, or a medium readable by a computer, well-known in the technical field to which the present disclosure belongs.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

Advantageous Effects

According to the present disclosure, when a mobile phone number of an acquaintance of an election campaigner is received from an election campaigner, the received number is linked as an acquaintance of the corresponding election campaigner and is stored in a database as a voter number. Therefore, the present invention enables the management of a list of voters linked as acquaintances of each election campaigner.

In addition, according to the present invention, when a request to transmit an election campaign message is received from an election candidate, an election campaign message is transmitted to the terminal of the voter linked to the election candidate. When the election campaign message is sent, the sender number of the message sent to each voter is set as the mobile phone number of the election campaigner linked to the corresponding voter as an acquaintance. Therefore, the recipient does not feel resistance in receiving the election campaign message.

The advantages of the present disclosure are not limited to the above-mentioned advantages, and other advantages, which are not specifically mentioned herein, will be clearly understood by those skilled in the art from the following description.

The invention claimed is:

1. An apparatus for transmitting election campaign messages in a manner of displaying a phone number of an acquaintance of a recipient, comprising:
   a database storing a name and a mobile phone number of at least one election campaigner who acts for an election candidate using an election campaign message transmission service, and a mobile phone number of at least one voter linked as an acquaintance to each election campaigner;
   a communication unit communicating with a terminal of the election candidate, a terminal of the election campaigner, and a terminal of the voter; and
   a processor which, upon receiving an election campaign message transmission request from a specific election candidate's terminal, sends an election campaign message to the terminal of the voter linked to the specific election candidate, sets a phone number of a sender, who sends the message to each voter, as a mobile phone number of the election campaigner linked to each voter as an acquaintance, and then sends the message,
   wherein when receiving at least one acquaintance's mobile phone number from the election campaigner's terminal, the processor sends a request message for election campaign message reception consent to the received mobile phone number, and stores the mobile phone number, which agreed to receive the election campaign message, as a voter.

2. The apparatus according to claim 1, wherein when receiving a subscription request of the election campaign message transmission service from the specific election candidate, the processor stores election campaign message transmission service subscription information of the specific election candidate in a database,
   wherein when receiving a subscription request of the election campaign message transmission service for a specific election campaigner from the terminal of the specific election candidate, the processor sends a service subscription request to the mobile phone number of the specific election campaigner, and when receiving a service subscription consent, stores the service subscription information of the specific election campaigner in the database,
   wherein when receiving a service subscription request for the mobile phone number of at least one acquaintance from the terminal of the specific election campaigner, the processor sends a service subscription request to the mobile phone number of the at least one acquaintance, links the mobile phone number, which received the service subscription consent, as an acquaintance of the specific election campaigner, stores the mobile phone number as a voter, and stores service subscription information in the database,
   wherein the processor provides the election candidate with the authority to request a service subscription for the election campaigner, and sets the election campaigner who has been granted the service subscription authority from the election candidate as a senior election campaigner, and
   wherein the processor provides the senior election campaigner with the authority to request service subscription for other election campaigners.

3. The apparatus according to claim 1, wherein when receiving a service cancellation request from a specific voter's terminal, the processor stores service cancellation information in the database, and provides the service cancellation details to at least one of the terminal of the election campaigner linked as an acquaintance of the specific voter, the terminal of the election candidate of the corresponding election campaigner, and the terminal of the specific voter,
   wherein when receiving a service cancellation request from a specific election campaigner's terminal, the processor stores service cancellation information in the database, and provides the service cancellation details to at least one of the terminal of the specific election campaigner and the terminal of the election candidate of the specific election campaigner, and
   wherein when receiving a service cancellation request from a specific election candidate's terminal, the processor stores service cancellation information in the database, and provides the service cancellation details to the terminal of the specific election candidate.

4. The apparatus according to claim 3, wherein the processor stores at least one, among the name and the phone number of the voter, the name and the phone number of the election campaigner who recommended the service subscription to the voter, the service subscription date, and the service cancellation date, in a voter table of the database, and
   wherein the processor stores at least one, among the name and the phone number of the election campaigner, information of a person who recommended the service subscription to the election campaigner, the service subscription date of the election campaigner, and the service cancellation date of the election campaigner, in an election campaigner table of the database.

5. The apparatus according to claim 1, wherein when receiving at least one acquaintance's mobile phone number from the election campaigner's terminal, in a case of receiving the relationship information between the election campaigner and the acquaintance, the processor stores relationship information between the election campaigner and the acquaintance in the database,
   wherein when receiving an election campaign message transmission request from a specific election candidate's terminal, the processor creates greetings based on the relationship information of each voter and the election campaigner linked to each voter, and
   wherein the processor sends the created greetings by attaching the greetings to the election campaign message.

6. The apparatus according to claim 1, wherein the processor calculates an election campaign index for the corresponding election candidate based on the number of election campaigners for the election candidate, the number of voters linked to each election campaigner, and the number of voters who have consented to receive election campaign messages,
   wherein the processor calculates an election campaign effectiveness score of the election campaign message transmission service based on public opinion poll data for the election candidate in public opinion poll data collected from the outside, and the calculated election campaign index, and wherein when receiving a specific target value of the election campaign effectiveness score from the election candidate's terminal, the processor calculates at least one of the number of required election campaigners, the number of voters linked per required election campaigners, and the total number of required voters to achieve the specific target value, and provide the calculated results to the election candidate's terminal.

7. The apparatus according to claim 6, wherein the processor calculates an election campaign index for the corresponding election candidate based on the number of election campaigners for the election candidate, the number of voters linked to each election campaigner, and the number of voters who have consented to receive election campaign messages, and wherein the processor calculates an actual expected value of the calculated election campaign index based on age-specific voting rate data during a recent specific period and the number of age-specific voters linked to the election candidate.

8. The apparatus according to claim 1, wherein the processor receives at least one of the age, gender, and interests of the voter linked as an acquaintance from the election campaigner's terminal, and wherein when receiving an election campaign message transmission request from the terminal of a specific election candidate, the processor includes the contents of a pledge, which match at least one of each voter's age, gender, and interests, out of the pledges of the election candidate, and transmits the election campaign message to each voter.

9. A method for transmitting election campaign messages in a manner of displaying a phone number of an acquaintance of a recipient, which is executed by a computer, comprising the operations of:

receiving at least one acquaintance's mobile phone number from an election campaigner's terminal;

sending a request message for election campaign message reception consent to the received mobile phone number, linking the mobile phone number, which agreed to receive the election campaign message, as an acquaintance of the campaigner, and storing the mobile phone number as a voter;

receiving an election campaign message transmission request from a terminal of a specific election candidate; and sending an election campaign message to a voter's terminal linked to the specific election candidate, setting a sender number of the message transmitted to each voter as a mobile phone number of the election campaigner linked to each voter as an acquaintance to send the message, wherein the computer comprises:

a database storing a name and a mobile phone number of at least one election campaigner who acts for an election candidate using an election campaign message transmission service, and a mobile phone number of at least one voter linked to each election campaigner as an acquaintance; and a communication unit communicating with a terminal of the election candidate, a terminal of the election campaigner, and a terminal of the voter.

10. A computer-readable recording medium combined with a computer as hardware, and storing a program for executing the method of claim 9.

\* \* \* \* \*